Figure 1:
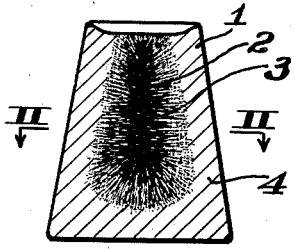

March 23, 1937.  E. E. TROSS  2,074,712

METHOD OF MAKING WELDING RODS

Filed Feb. 19, 1935

WITNESSES
A. B. Wallace.
J. E. Dickinson.

INVENTOR.
Ernest E. Tross
BY Brown, Critchlow & Flick
his ATTORNEYS.

Patented Mar. 23, 1937

2,074,712

UNITED STATES PATENT OFFICE 2,074,712

METHOD OF MAKING WELDING RODS

Ernest E. Tross, Youngstown, Ohio, assignor to United Engineering & Foundry Company, Pittsburgh, Pa., a corporation of Pennsylvania Application February 19, 1935, Serial No. 7,194

7 Claims. (Cl. 29—160.4)

This invention relates to an improved method of making welding rods and articles of that character in which uniformity in composition and purity of the metal going to make up the articles are desired.

In the art of metal welding in which the parts being welded are joined together by the fusing therewith of welding rods, it is well known that the majority of weld failures and the formation of imperfect and unsatisfactory welds are due to the impurities in and the non-uniformity of the metal comprising the welding rods. These imperfections, as is also well known by those skilled in the art, are present in the welding rods as a result of the way they are made. For the most part such rods are made from steel ingots which are rolled in their entirety and drawn or otherwise reduced to rods of the size desired for welding and then cut into the lengths required. When so made the resulting rods embody the non-uniformity in structure of the ingots as well as contain the impurities which are present in the metal going to make up the ingots, and while it is known that their faults can be overcome by making them of pure uniform steel, there has been heretofore no satisfactory method for accomplishing this end by means of which they could be produced below a prohibitive or uncompetitive cost.

With these thoughts in mind it is an object of this invention to provide an improved method of making welding rods or articles of that nature having the aforementioned characteristics as to purity and uniformity and which is both feasible and economical to practice.

A more specific object is to provide for making articles of this character out of the rim portion of steel ingots and in such a way as to commercially make use of the remaining portions of the ingots.

Steel ingots of the type used for this purpose as is well known are formed by pouring the steel in a molten condition into ingot molds and permitting it to solidify. During the solidification of the metal as is also common knowledge unless means is employed to prevent such action the impurities contained in the molten mass gravitate toward the center of the ingot. As a result an ingot is provided which comprises a central section commonly referred to as the pipe portion in which the greatest amount of impurities is found and in which the carbon content is the highest. In volume such section constitutes usually from 2 to 6 per cent of the ingot. Surrounding it a portion comprising in the neighborhood of 45 to 55 per cent of the ingot is formed which is usually referred to as the segregation portion and is made up of metal containing varying percentages of impurities and varying percentages of the various other elements found in the steel. Beyond this latter portion there is formed what is termed the rim portion of the ingot. This portion comprises in the neighborhood of 35 to 45 per cent of the volume of the ingot and is made up of a steel which is low in carbon, substantially free from impurities, and very uniform in composition. While in the past the entire ingots have been employed in the making of welding rods, it is the purpose of this invention to make such rods only out of this last-mentioned rim portion of the ingots and thereby obtain the qualities and characteristics in the rods which are required for the making of perfect welds.

Figure 2:
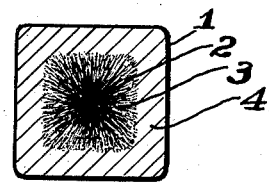
Figure 3:
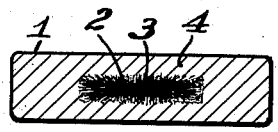
Figure 4:
Figure 5:
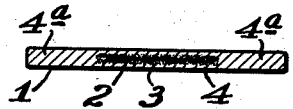
Figure 6:
Figure 7:
Figure 8:

By way of explaining the invention, reference will be had to the accompanying drawing of which Fig. 1 is a vertical section taken through an ingot of the type employed in the making of welding rods, and which is shaded to designate the variations in the composition of its structure, the heavier shading representing the greater percentage of impurities and non-uniformities in metal; Fig. 2 a horizontal section taken on the line II—II of Fig. 1; Figs. 3, 4 and 5 sectional views showing it at different stages during its reduction to strip or plate; Fig. 6 a sectional view of one of the edges of the strip or plate comprising the rim portion of the ingot after it has been removed from the strip or plate and passed through a set of forming rolls of a wire-making machine; Fig. 7 a sectional view of the strands produced from the section shown in Fig. 6 after it has been passed through the slitting elements of the wire-making machine; and Fig. 8 the same strands after they have been reduced to rounds.

In accordance with the invention an ingot 1 is poured in the conventional manner, and as previously set forth comprises a central or pipe section 2 containing the highest percentage of impurities, an intermediate section 3 which is referred to as the segregation and contains varying percentages of impurities and varying amounts of the different elements found in the steel, and lastly an outer section 4 which is commonly referred to as the rim portion and made up of pure low carbon steel that is highly uniform in composition and ideally suited for the making of welding rods or articles in which steel having such characteristics is required.

After being processed for rolling in a well-known manner the ingot 1 is passed through the working passes of a rolling mill a sufficient number of times to reduce it as shown in Figs. 3, 4 and 5 to a strip or plate, preferably approximating the thickness of the gauge of rods which it is desired to make from it, although it may be reduced to a somewhat greater thickness as will presently appear. By rolling the ingot in this way its rim section is greatly expanded at the two edges 4a of the resultant strip, see Fig. 5, which makes it possible for these edges to be readily removed by a slitting operation and made use of for making welding rods by a further slitting operation, while leaving the remainder of the strip in a perfectly satisfactory condition to use for other purposes for which it is suitable. To make these strips 4a into welding rods they are preferably passed after they are removed from the strip through a suitable wire-making machine of the type disclosed in United States Patent No. 1,136,373 which creases the strips and slits them into strands. These strands are then either rolled or drawn in a well-known manner through suitable rolls or wire-drawing dies to make them of the correct rod gauge and provide them with a perfectly round contour or whatever contour is desired. It will also be appreciated of course that the whole ingot can be so processed if desired and the resultant rods separated for their different uses, and also that if the strip is not reduced to rod gauge the slitted strands can be readily drawn to any size desired by the conventional wire-drawing process.

In accordance with such method as is apparent rods are produced which are formed of rim steel embodying the desired welding rod characteristics and in a very economical manner, inasmuch as the remaining portion of the strip formed from the ingot is at the same time and without additional cost processed for commercial disposal in either wire, strip or plate form.

Furthermore by such method the rods can be produced at a cost which is lower than the cost of making such articles as they have been customarily made in the past, that is, by the conventional wire-drawing process.

According to the provisions of the patent statutes, I have explained the principle and mode of construction of my invention, and have illustrated and described what I now consider to be its best embodiment. However, I desire to have it understood that, within the scope of the appended claims the invention may be practiced otherwise than as specifically illustrated and described.

I claim:

1. The method of making articles out of rim steel which comprises rolling a steel ingot lengthwise into a relatively thin flat strip or platelike blank, slitting from the side edges of said blank the portions thereof which comprise rim steel only and forming the portion slit from said edges into the articles desired.

2. The method of making rods formed of rim steel which comprises rolling a steel ingot lengthwise into a flat strip or platelike blank, slitting the rim steel portion of the ingot from the side edges of said blank, slitting said edge portions into strands and reducing said strands to rounds of the desired diameter.

3. The method of making rods formed of rim steel which comprises rolling a steel ingot lengthwise into a flat strip or platelike blank, slitting the rim steel portions from the edges of said blank, creasing said edge portions lengthwise to facilitate slitting, slitting them after they are creased to produce strands and then processing the strands to produce rounds of a desired gauge.

4. The method of making welding rods which comprises rolling a steel ingot lengthwise into a flat strip or platelike blank, slitting the rim steel portions from the side edges of said blank, slitting said rim steel edges into strands, reducing said strands to rounds of a desired gauge, and then cutting them into desired lengths.

5. The method of making welding rods or the like which comprises rolling a steel ingot lengthwise into a flat strip or platelike blank, slitting the rim steel portion at the side edges of said blank into strands, reducing said strands to rods of desired gauge without damaging the central portion of the strip or plate for use for other purposes.

6. The method of producing rim steel which comprises casting a steel ingot with a rim portion substantially free of impurities and low in carbon, rolling the ingot lengthwise into a relatively thin flat strip or plate-like blank, and then slitting only the rim steel from the side edges of said blank.

7. The method of producing strands of rim steel which comprises casting a steel ingot with a rim portion substantially free of impurities and low in carbon, rolling the ingot lengthwise into a relatively thin flat strip or plate-like blank, and then slitting the rim steel portions at the side edges of said blank into strands.

ERNEST E. TROSS.